United States Patent
Simon

(10) Patent No.: US 10,193,483 B2
(45) Date of Patent: Jan. 29, 2019

(54) METHOD AND DEVICE FOR THE CYCLIC DIGITAL TRANSMISSION OF A POSITION VALUE OF A MOVING OBJECT WITH INERTIAL MASS

(71) Applicant: SEW-EURODRIVE GMBH & CO. KG, Bruchsal (DE)

(72) Inventor: Olaf Simon, Bruchsal (DE)

(73) Assignee: SEW-EURODRIVE GMBH & CO. KG, Bruchsal (DE)

(*) Notice: Subject to any disclaimer, the term of this patent is extended or adjusted under 35 U.S.C. 154(b) by 22 days.

(21) Appl. No.: 15/593,174

(22) Filed: May 11, 2017

(65) Prior Publication Data

US 2017/0250640 A1 Aug. 31, 2017

Related U.S. Application Data

(63) Continuation of application No. 14/128,469, filed as application No. PCT/EP2012/002021 on May 10, 2012, now Pat. No. 9,651,952.

(30) Foreign Application Priority Data

Jun. 20, 2011 (DE) .................. 10 2011 105 524

(51) Int. Cl.
| | |
|---|---|
| *H02P 21/12* | (2016.01) |
| *H02P 27/08* | (2006.01) |
| *H02K 11/21* | (2016.01) |
| *G01D 5/00* | (2006.01) |

(Continued)

(52) U.S. Cl.
CPC ............... *H02P 21/12* (2013.01); *G01D 5/00* (2013.01); *G01D 21/00* (2013.01); *G05D 3/125* (2013.01); *H02K 11/21* (2016.01); *H02P 27/08* (2013.01)

(58) Field of Classification Search
None
See application file for complete search history.

(56) References Cited

U.S. PATENT DOCUMENTS

| | | | |
|---|---|---|---|
| 5,099,185 A | 3/1992 | Kono et al. | |
| 5,874,821 A * | 2/1999 | Monleone ............... | H02P 6/16 318/592 |
| 6,388,656 B1 | 5/2002 | Chae | |

(Continued)

FOREIGN PATENT DOCUMENTS

| | | |
|---|---|---|
| CN | 1256425 A | 6/2000 |
| CN | 101358844 A | 2/2009 |

(Continued)

OTHER PUBLICATIONS

International Search Report and Written Opinion, issued in corresponding International Application No. PCT/EP2012/002021.

*Primary Examiner* — Bentsu Ro
*Assistant Examiner* — Said Bouziane
(74) *Attorney, Agent, or Firm* — Hunton Andrews Kurth LLP

(57) ABSTRACT

In a method and device for the cyclic digital transmission of a position value of a moving object with inertial mass, the value range of the transmitted position value is restricted such that no complete rotation or, in the case of a linear motion, other complete period caused by mechanical conditions may be mapped, and the actual position is formed by detecting value-range exceedances in an evaluation unit.

14 Claims, 2 Drawing Sheets

(51) Int. Cl.
*G01D 21/00* (2006.01)
*G05D 3/12* (2006.01)

(56) References Cited

U.S. PATENT DOCUMENTS

| | | | |
|---|---|---|---|
| 6,591,220 B1 * | 7/2003 | Rodi | G01D 5/2455 |
| | | | 702/158 |
| 7,949,009 B2 | 5/2011 | Schultze | |
| 8,866,431 B2 * | 10/2014 | Kawajiri | G05B 9/02 |
| | | | 318/568.22 |
| 8,903,548 B2 * | 12/2014 | Galm | B61L 3/125 |
| | | | 700/245 |
| 2001/0006344 A1 | 7/2001 | Gaessler et al. | |
| 2006/0184256 A1 | 8/2006 | Iwashita et al. | |
| 2009/0037127 A1 | 2/2009 | Tiemann | |
| 2009/0161691 A1 * | 6/2009 | Schultze | G05B 19/414 |
| | | | 370/465 |
| 2010/0211273 A1 | 8/2010 | Kollner et al. | |
| 2010/0315071 A1 * | 12/2010 | Galm | G01D 5/202 |
| | | | 324/207.15 |
| 2011/0179338 A1 * | 7/2011 | Craven | H03M 7/40 |
| | | | 714/772 |
| 2012/0296449 A1 | 11/2012 | Kimura et al. | |
| 2013/0261802 A1 | 10/2013 | Simon | |

FOREIGN PATENT DOCUMENTS

| | | |
|---|---|---|
| CN | 101828095 A | 9/2010 |
| DE | 10 2007 062 333 B3 | 4/2009 |
| DE | 10 2011 103 735 A1 | 6/2012 |
| EP | 2023092 A2 | 2/2009 |
| JP | H02-214496 A | 8/1990 |
| JP | H09-47100 A | 2/1997 |
| JP | 2004-037246 A | 2/2004 |
| JP | 2006-154998 A | 6/2006 |
| JP | 2007-136617 A | 6/2007 |
| JP | 2009-095154 A | 4/2009 |
| JP | 2010-134562 A | 6/2010 |

* cited by examiner

METHOD AND DEVICE FOR THE CYCLIC DIGITAL TRANSMISSION OF A POSITION VALUE OF A MOVING OBJECT WITH INERTIAL MASS

CROSS REFERENCE TO RELATED APPLICATIONS

This application is a continuation of U.S. patent application Ser. No. 14/128,469 filed Feb. 7, 2014, which is the national phase of International Application No. PCT/EP2012/002021 filed May 10, 2012, which claims priority to German Patent Application No. 10 2011 105 524.3 filed Jun. 20, 2011, each of which is expressly incorporated herein in its entirety by reference thereto.

FIELD OF THE INVENTION

The present invention relates to a method and device for the cyclic digital transmission of a position value of a moving object with inertial mass.

BACKGROUND INFORMATION

Angular-position sensors are generally familiar. In the case of angular-position sensors in the form of incremental encoders, the detected angular value of a shaft is transmitted digitally.

SUMMARY

Example embodiments of the present invention provide for the transmission of the detected values from the angular-position sensor to an electronic device, in doing which, the intention being to use a data transmission which is robust with respect to interferences.

Among features in the case of the method for the closed-loop control of a drive are that a position value is detected recurrently over time, and the associated information is transmitted to a control device,
the position value being characterized by at least two values, in particular, a partial-angle value and a fine-angle value, especially digital values,
the first value being denotable with a whole number, and a position-value range being assigned to each number,
each position range characterized by a first value being assigned mutually separate sub-ranges of the position range,
each of these sub-ranges being characterized by a second value denotable as a whole number,
the second value being transmitted prior in time to the first value, where
  (i) after the newly detected second value has been transmitted, a model value is determined for the first value from this newly detected and the previously transmitted second value, and the position value thus determined is used by a control device to determine an updated value of a manipulated variable of the control device,
  (ii) after the newly detected second value has been transmitted, the newly detected first value is transmitted, and the model value thus determined is then compared to the newly detected first value, and an action is carried out if they do not agree,
in particular, the action being the communication and/or display of warning information and/or bringing the drive to rest or transferring the drive into a safe state,
in particular, the manipulated variable being a voltage space vector, especially a stator-voltage space vector of an electric motor of the drive,
in particular, step (i) being repeated.

This is advantageous in that safety is increased, and the determination of the new manipulated variable is nevertheless able to be started especially early on in each cycle step.

Among features in the case of the method for the closed-loop control of a drive are that a position value is detected recurrently over time, and the associated information is transmitted to a control device,
the position value being characterized by at least two values, in particular, a partial-angle value and a fine-angle value, especially digital values,
the first value being denotable with a whole number, and a position-value range being assigned to each number,
each position range characterized by a first value being assigned mutually separate sub-ranges of the position range,
each of these sub-ranges being characterized by a second value denotable as a whole number,
the second value being transmitted prior in time to the first value, where
  (i) after the newly detected second value has been transmitted, a model value is determined for the first value from the newly detected and the previously transmitted second value, additionally taking the last determined velocity into account, and the position value thus determined from the second value and the model value being used by a control device to determine an updated value of a manipulated variable of the control device,
  (ii) after the newly detected second value has been transmitted, the newly detected first value is transmitted, and the velocity value is updated based on the newly detected first value and the newly detected second value, in doing which, the previously detected first value and the previously detected second value also being taken into account,
in particular, the manipulated variable being a voltage space vector, especially a stator-voltage space vector of an electric motor of the drive,
steps (i) and (ii) being repeated.

This offers the advantage that the velocity value is determinable from the actual, newly detected position value, and it is not necessary to use a model value for that purpose. In this context, the cycle time is so short that the velocity value is unable to change at all or is able to change only slightly within this time, especially given maximum acceleration of the object.

After the first value has been transmitted, it may be compared to the value determined according to step (i), and in response to a deviation, an action is triggered, especially such as the display and/or communication of warning information and/or switching off the drive and/or initiating a safe state of the drive. This is advantageous because safety is increased, and in the event of a malfunction, a warning is able to be displayed and a safe state is able to be initiated.

Check information, especially a CRC datum may be transmitted upon transmitting the first value, and/or further check information, especially a CRC datum, may be transmitted upon transmitting the second value. This is advantageous because the data transmission is able to be implemented reliably, and therefore the action is able to be carried out in the case of a fault.

The value range of the transmitted position value is restricted such that no complete rotation or, in the case of a linear motion, other complete period caused by mechanical conditions, may be mapped, and the actual position is formed by detecting value-range exceedances in an evaluation unit,
in particular
    at a first instant, a position being transmitted which is not or is far less sharply value-range-restricted than in continuous operation
    and/or the value range being determined in a manner that the path difference occurring in one scanning cycle at maximum velocity is less than half the selected value range, the value range being selected to be as small as possible
    and/or instead of the value-range-restricting absolute position, the difference relative to the previous position with the same value-range restriction being transmitted.

This offers the advantage that only a small data stream must be transmitted, and therefore a small bandwidth is sufficient for the transmission. In addition, safety is able to be increased, since after the complete position value has been transmitted, a comparison may be made to the position value determined from the value-range-restricted value, and thus it is possible to monitor whether the maximum allowed acceleration was exceeded, thus, an unforeseen event such as a fault or the like has occurred. Alternatively, it is also possible to dispense with the cyclic transmission of the complete position value, which means a data connection with small bandwidth therefore suffices for a rapid position-value transmission. The data detected by a sensor is thus able to be compressed and is transmittable with data compression.

By comparing the difference to the half value range, the complete information about the position value is easily able to be reconstructed.

It is also advantageous that the digital transmission is robust with respect to interference effects such as magnetic-field radiation or the like.

Among features in the case of the alternative method for the cyclic digital transmission of a position value of a moving object with inertial mass are that the value range of the transmitted position value is restricted compared to the value range of possible position values, particularly so that no complete rotation or, in the case of a linear motion, other complete period caused by mechanical conditions may be mapped, and the actual position is determined by forming an estimated value for the position from the previous position and the previously determined velocity, and it is corrected by the value-range-restricted transmitted position value,
in particular
    by comparing the value-range-restricted estimated position value to the value-range-restricted transmitted position value, a value-range exceedance is ascertained and utilized to correct the estimated value,
    and/or one time at the beginning, a position is transmitted whose value range includes the range of possible positions occurring,
    and/or instead of the value-range-restricted absolute position, the difference relative to the previous position with the same value-range restriction is transmitted.

The advantage in this context is that the position value is detected in connection with an inertial mass. Due to the therefore permitted limitation of the accelerations and jerks occurring, thus, time derivations of the accelerations, the change in velocity in the associated cycle time is allowed to be limited, and thus an estimated cycle value only has to be corrected by less than one unit of resolution, e.g., of one coarsely resolved track.

The position value may be characterized by at least two values, in particular a partial-angle value and sub-angle value and/or fine-angle value, especially digital values, the first being denotable with a whole number, and a position-value range being assigned to each number,
each position range characterized by a first value being assigned mutually separate sub-ranges of the position range, each of these sub-ranges being characterized by a second value denotable as a whole number,
at a first instant, a position value being detected and the associated first and second values being transmitted, where
    (i) a further position value is detected and the associated, thus newly detected, second value is transmitted,
    (ii) whereupon, from the newly detected second value and the previously detected second value, the position-value range characterized by the first value is determined, thus also the first value belonging to the newly detected position value.

This is advantageous in that again, the complete information about the detected position value is available at a first instant, and thus a new position value, thereupon determined only relative to this first position value, is determined. Consequently, a compressed data transmission is permitted or an increased redundancy in the data transmission.

The position value may be an angular value of a rotating part, thus object, the object as inertial mass having a moment of inertia. The advantage in this case is that the full rotation of 360° is able to be split into a plurality of sub-ranges, therefore permitting a resolution of the full rotation into the position-value ranges thus resulting.

The transmission may be repeated recurrently over time, e.g., especially may be repeated cyclically, particularly at regular time intervals,
in particular, steps (i) and (ii) being carried out repeatedly in succession. This has the advantage that the position is determinable in constantly recurring fashion. In so doing, the time intervals are preferably so short that, in turn, the maximum change in position value to be anticipated remains below a critical value that preferably is less than one half position-value range.

In the case of step (ii), an estimated value may be determined from the previously detected or determined position value and the associated velocity, and the second value of the newly detected position value may be compared to the second value of the estimated value, and the difference may be determined between the second value of the newly detected position value and the second value of the estimated value, and from that, the position range belonging to the newly detected position value may be determined. The advantage in this case is that a velocity value is known, and therefore an estimated value is determinable anyway by adding the change in position value resulting from the velocity and the associated time interval, to the old position value.

In step (ii), the difference may be determined between the newly detected second value and the previously detected second value, and in particular, if one half position range is exceeded, it being inferred that the newly detected position value lies in an adjacent position range. This offers the advantage that the new position value is completely determinable in a simple manner from the mere difference and the knowledge about the maximum change in the position value to be anticipated, although only a restricted value range must be transmitted.

In step (ii), the newly detected second value and the previously detected second value may be compared, and the adjacent range in which the newly detected position value is located may be determined, particularly if the difference between the newly detected second value and the previously detected second value exceeds one half position range. This is advantageous because a complete determination of the position value is permitted in easy fashion, in spite of the transmitted and restricted information.

The change in velocity between two detections of position carried out in succession at a time interval Δt may be limited to a critical value, especially which is determined or at least co-determined by the inertial mass. The advantage here is that only a finite number of possible position values—especially two—is attainable, and the new position value must be determined from this finite number.

The position value may be an angular value or a linear position, in particular, the velocity being an angular velocity or a velocity occurring in the linear direction. This has the advantage that the invention is usable in rotary and linear drive controls, thus, regardless of the kind of position-detecting sensor.

A first and second value may be assigned to one track, especially encoder track, each, the first value being assigned to a finer resolving track than the second value. The advantage in this context is that only a limited information value has to be transmitted, and nevertheless, the complete information about the position is obtainable.

Each position range characterized by a second value, particularly a sub-angle value, may be assigned mutually separate sub-ranges of the position range, each of these sub-ranges being characterized by a third value, particularly a fine-angle value, which is denotable as a whole number, in particular, at the first instant, the position value being detected, and the associated first and second and third values being transmitted,
the third value being transmitted with the second value, particularly prior to or after the second value. This is advantageous in that a partial angle is detectable and transmittable as first value, and a sub-angle is detectable and transmittable as second value, the sub-angle being able to be resolved even more finely by the use of a fine-angle range. In this context, the transmission of the fine angle and sub-angle information is then sufficient to determine the more coarsely resolving partial angle.

Among features in the case of the method for the closed-loop control of a drive are that a position value is detected recurrently over time and the associated information is transmitted to a control device, especially using a method as described above,
the position value being characterized by at least two values, in particular a partial-angle value and a fine-angle value, especially digital values,
the first value being denotable with a whole number, and a position-value range being assigned to each number,
each position range characterized by a first value being assigned mutually separate sub-ranges of the position range, each of these sub-ranges being characterized by a second value denotable as a whole number,
the second value being transmitted prior in time to the first value, where
  (i) after the newly detected second value has been transmitted, a first value which corresponds to the newly detected first value is determined from the newly detected and the previously transmitted second value, and the position value thus determined is used by a control device to determine an updated value of a manipulated variable of the control device,
in particular, step (i) being repeated.

This is advantageous because the time duration for transmitting the first value is already usable for determining the next manipulated-variable value.

Among features in the case of the method for the closed-loop control of a drive are that a position value is detected recurrently over time and the associated information is transmitted to a control device,
the position value being characterized by at least two values, in particular, a partial-angle value and a fine-angle value, especially digital values,
the first value being denotable with a whole number, and a position-value range being assigned to each number,
each position range characterized by a first value being assigned mutually separate sub-ranges of the position range, each of these sub-ranges being characterized by a second value denotable as a whole number,
the second value being transmitted prior in time to the first value, where
  (i) after the newly detected second value has been transmitted, a first value which corresponds to the newly detected first value is determined from the newly detected and the previously transmitted second value, additionally taking the last determined velocity into account, and the position value thus determined is used by a control device to determine an updated value of a manipulated variable of the control device,
  (ii) after the newly detected second value has been transmitted, the velocity value is updated based on the newly detected first value and the newly detected second value, in doing which, the previously detected first value and the previously detected second value also being taken into account,
steps (i) and (ii) being repeated. The advantage here is that an estimated value is also determinable at an occurring velocity, and must only be corrected.

After the first value has been transmitted, it may be compared to the value determined according to step (i), and in response to a deviation, an action may be triggered, especially such as display and/or communication of warning information and/or switching off the drive and/or initiating a safe state of the drive. This is advantageous because safety is increased.

A position value may be detected in a sensor and the sensor may be connected to an evaluation unit via a digital interface,
the evaluation unit having a memory and a device for determining the position value from a transmitted position value restricted in value range,
in particular, the evaluation unit being connected to a control device.

The advantage is that only a small bandwidth is needed for the data transmission.

Further features and aspects of example embodiments of the present invention are described in more detail below. Further combination possibilities of features of the specification and/or of the figures should become apparent for one skilled in the art.

Example embodiments of the present invention are explained in greater detail below with reference to schematic figures.

DETAILED DESCRIPTION

Figure 1:
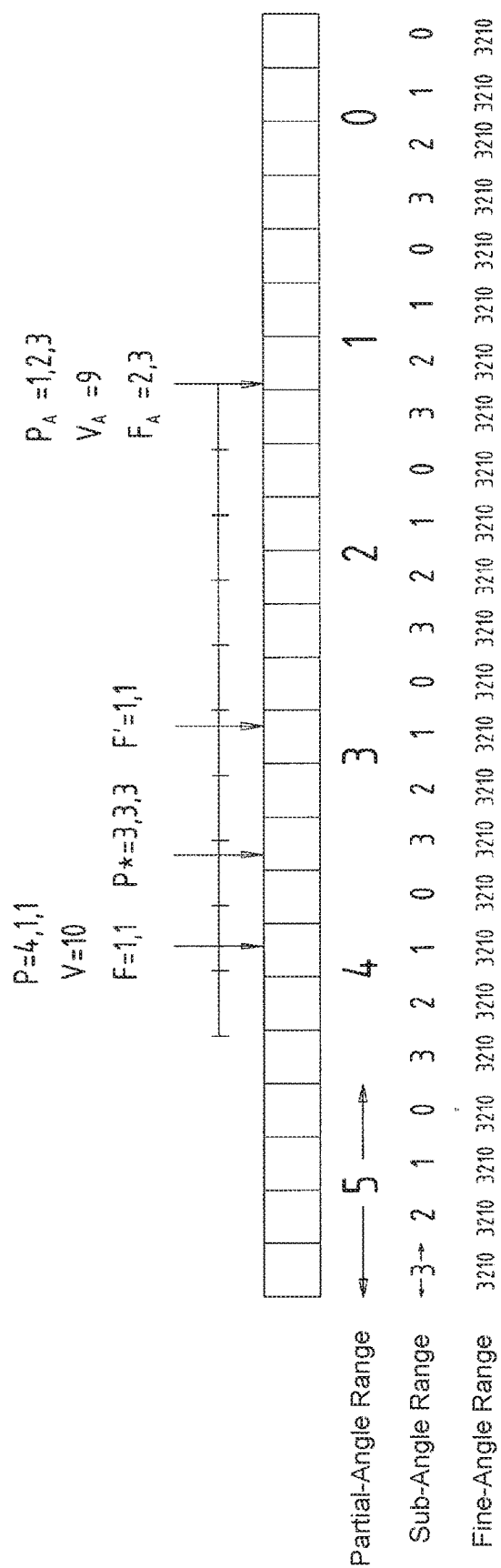
FIG. 1 illustrates an example embodiment of the present invention.

In the drive system according to example embodiments of the present invention, an angular-position sensor is connected in rotatably fixed manner to a shaft of the drive, e.g., a motor shaft of a converter-fed electric motor or to a shaft of a gear unit driven by a converter-fed electric motor, so that the angular position is detectable.

In this context, in a first period of time, the angular value is transmitted in digital form, thus, as a digital telegram or word.

The value transmitted to the signal electronics of the converter is used by an automatic control unit, provided in the signal electronics, to regulate the motor current by setting the motor voltage to a specific desired setpoint value.

The angular value is characterized by a partial-angle range and at least also a fine-angle range. In this context, the partial angle is only a coarse resolution of the entire rotation of 360°. The fine angle subdivides the respective partial-angle range into finer angular segments.

In transmitting the angular value, the fine-angle value is transmitted first in time, and after that, the coarser partial-angle value.

By taking critical values into account, especially maximum acceleration values and/or maximum jerks, thus, time derivations of the acceleration, and taking the last known angular value and angular-velocity value into account, it is possible for the signal electronics to already determine the newly detected angular value from the fine-angle values.

In this manner, it is possible for the automatic control unit particularly early on to take the newly detected angular value into account for the closed-loop control. Only a few computational steps are necessary for determining the newly detected angular value, which is why only a small amount of computing time must be expended. From the angular value thus determined and further values, the motor-voltage value to be newly set in each case by the converter is then calculated in the automatic control unit.

During this calculation time, the coarser partial-angle values are then also transmitted by the angular-position sensor to the signal electronics of the converter.

Thus, the actual detected angular value is then known directly in timely fashion, prior to the next time step. Consequently, safety is then increased, since the angular value determined from the fine angle, and the angular value transmitted fully may be compared to each other. In addition, the next angle determination is feasible from the next fine-angle value, using the fully transmitted angular value and a correspondingly updated angular-velocity value.

Therefore, in other words, the last completely transmitted value, thus including the fine-angle value and partial-angle value, is thus used in each time step, and by forming the difference relative to the previous value, the updated velocity is determined. From these values, an estimated value is then determined for the next angular value to be anticipated. To determine this angular value, it is taken into account that the drive is propelling an inertial mass, especially in linear or rotary fashion, and in this context, the velocity can only change by a maximum amount in the associated time step. This estimated value thus determined is also able to be characterized by a fine-angle value, a partial-angle value and possibly a sub-angle value. The then newly transmitted fine-angle value of the angular value newly detected and transmitted by the angular-position sensor is then used to determine the new angular value, which is then used immediately by the automatic control unit. After the complete transmission of the newly detected angular value carried out concurrently with that, a comparison is then made with the value determined only from the transmitted fine-angle value, thereby permitting a safety-oriented check test to be carried out. The method is repeated, in doing which, the updated angular velocity is determined again from the completely transmitted angular value, and then used repeatedly in corresponding fashion.

In example embodiments, the fully transmitted angular value is used only at a first time step. In the following time steps, only the angular value determined from the respective estimated value and the fine-angle value, preferably also from an additional sub-angle value, is then used repeatedly.

For further improvement, a sub-angle range is provided, whose resolution is between the resolution of the fine-angle range and the partial-angle range.

In example embodiments, two tracks are provided, namely, the partial-angle track and the fine-angle track. In so doing, m partial-angle ranges are disposed in the circumferential direction, and the partial-angle ranges in the circumferential direction are of equal length. The fine-angle ranges in the circumferential direction are of equal length, as well. Each partial-angle segment is assigned the same quantity of fine-angle ranges, this quantity in each case being able to be enumerated from 0 to n−1. In this context, m and n are each integral.

After a first period of time, in which the partial-angle value, thus, the number of the partial angle is detected by the angular-position sensor, and fine-angle value F1, thus, the number of the fine angle is detected by the angular-position sensor, fine-angle value F2 is detected after a time interval $\Delta t$.

To determine the angular value, thus, the missing information about the new partial-angle value, it is determined from the difference of the new fine-angle value relative to the previous fine-angle value F2−F1, and from the comparison of F1 and F2, whether or not an overshoot has taken place in the positive or negative direction of rotation. To that end, it is important only that maximum possible angular velocity v_max be so small, that the following applies $$(\tfrac{1}{2}*m-1) \le v\_\max * \Delta t \le (\tfrac{1}{2}*m).$$

Therefore, in the event of an overshoot, only the entry into a next-adjacent partial angle, i.e., partial-angle range, is possible. Thus, if the angle detection is carried out at a very small time interval $\Delta t$, a clear reconstruction of the newly detected angular value is permitted from the mere information of the newly detected fine-angle measured value and the previous angular value.

This detection of the fine-angle value is repeatable as often as desired after a respective further time interval $\Delta t$. Consequently, even the transmission of the fine-angle value alone is sufficient to determine the newly detected angular value in each case, in doing which, however, the detected angular value must be known completely at a first point in time.

In FIG. 1, an arrangement having three tracks is illustrated, namely, having a partial-angle track, a sub-angle track and a fine-angle track which resolves the sub-angle track more finely. In this case, m partial-angle ranges are disposed in the circumferential direction, e.g., m=32, and the partial-angle ranges in the circumferential direction are of equal length. Likewise, the sub-angle ranges in the circumferential direction are each of equal length, each partial angle being subdivided into n sub-angle ranges. The fine-angle ranges are each of equal length in the circumferential direction, q fine-angle ranges being assigned to each sub-angle range. Each partial-angle segment is assigned the same quantity of sub-angle ranges, this quantity in each case being able to be enumerated from 0 to n−1. In this context, m, q and n are each integral. In FIG. 1, q=4 and n=4.

Since the angle detection is carried out on a system with inertial mass, and the accelerations occurring lie below a maximum value a_max, a change in the angular velocity within time interval Δt is possible only by the maximum velocity difference $$\Delta v\_max = a\_max * \Delta t.$$

From the last known angular velocity v_old and the last known angle α_old, an estimated value is obtained $$\alpha\_estimate = \alpha_{old} + v\_old * \Delta t.$$

The angular change relative to this estimated value amounts to a maximum of Δv_max*Δt and produces a maximum overshoot of the sub-angle into the next adjacent sub-angle range.

Therefore, the detected new values of the partial angle, sub-angle and fine angle do not have to be available to determine the next angular value, but rather, the sub-angle and the fine angle are sufficient if the angular value valid for the previous period of time is known. The reason is that the new sub-angle range may be obtained from the comparison of the old sub-angle value to the new sub-angle value and from the difference between the new and old sub-angle values. Since the new fine angle is transmitted, this value is also known, the fine-angle value unambiguously assigning an angular value to the new sub-angle value.

This method is able to be portrayed in FIG. 1 based on a concrete example: The old angular value, by way of example, is $P_A$=(partial-angle value=1, sub-angle value=2, fine-angle value=3). In this case, the old angular velocity amounts to 9 sub-angle ranges per period of time Δt. Thus, an estimated value of P*=(partial-angle value=3, sub-angle value=3, fine-angle value=3) results.

If the new measured value now has fine angle 1 and sub-angle 1, two possible angular values are obtained which are denoted as F=(sub-angle 1, fine angle 1) and F'=(sub-angle 1, fine angle 1). However, since the maximum occurring change in velocity Δv_max=a_max*Δt is now again selected in such a way that Δv_max*Δt is less than half the partial-angle range, by subtraction and comparison, it is clearly ascertainable that the new angular value is F, but not F'. The new angular value is therefore determined as P=(partial-angle value=4, sub-angle value=1, fine-angle value=1), from which the new velocity is determined as 10 sub-angle ranges per period of time Δt. It is therefore possible to dispense with transmission of the newly detected partial-angle value.

Figure 2:
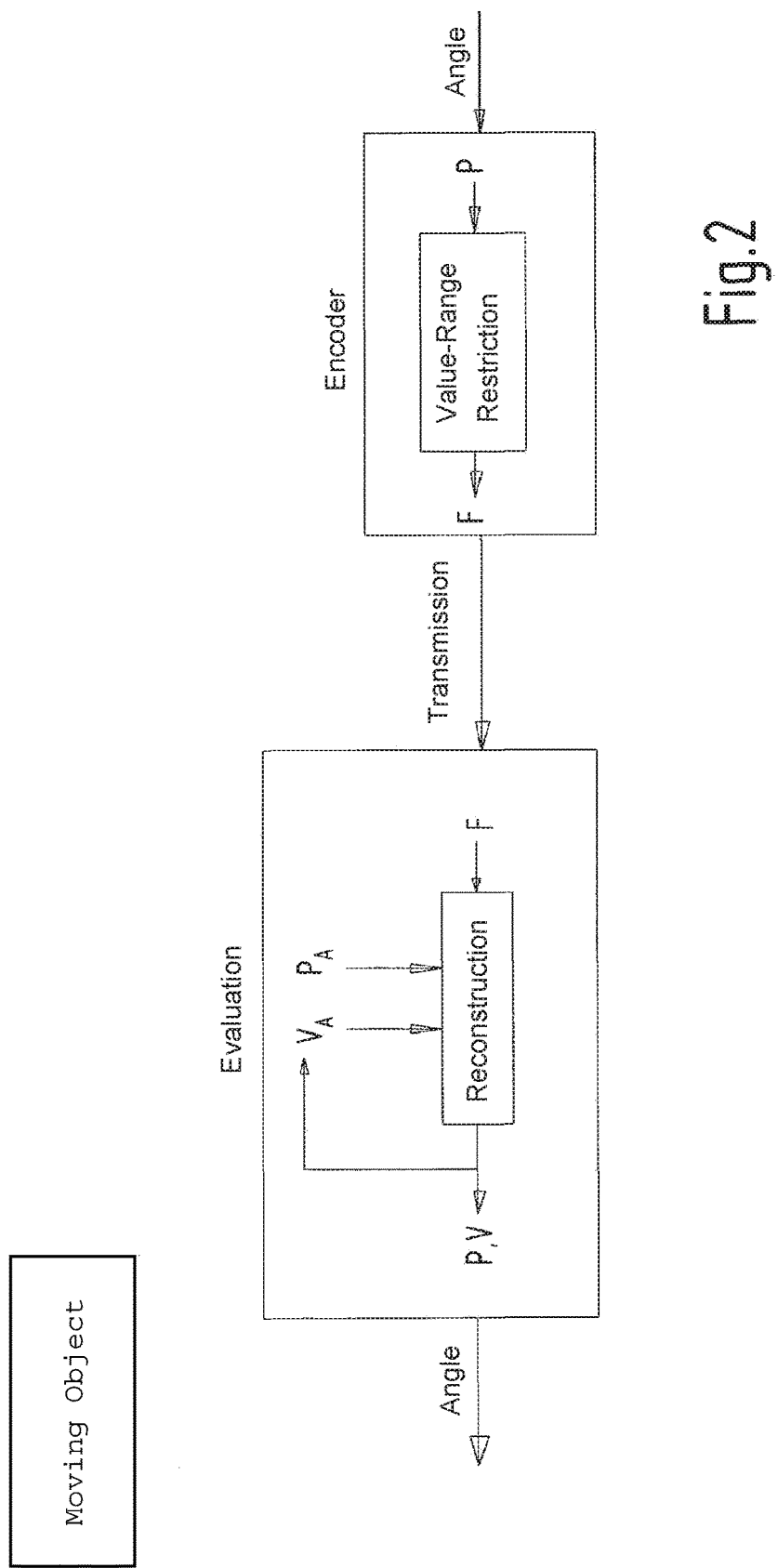
FIG. 2 illustrates a method according to an example embodiment of the present invention.

FIG. 2 shows the method in greater detail. In this instance, first of all the newly detected information about angular value P is reduced in the angular-position sensor to partial information F which includes only the sub-angle value and the fine-angle value, but not the partial-angle value. This value F is transmitted to the evaluation circuit which preferably is located in the control electronics of an inverter or converter.

In the evaluation circuit, newly detected angular value P and newly occurring angular velocity v are determined from partial information F, taking previously detected or determined angular value $P_A$ and previously determined angular velocity $v_A$ into account.

In the case of further exemplary embodiments, instead of the angular position, a linear position is used, and therefore a partial position, etc. instead of the partial angle.

The practical applications of methods for transmitting angle information described in the aforesaid exemplary embodiments are usable advantageously in a converter. In that context, the converter feeds an electric motor, on whose rotor shaft an angular-position sensor is mounted, the angle information detected by it being transmitted in the manner indicated above to control electronics of the converter, which have an automatic control unit. The automatic control unit uses the transmitted angle information to determine such a voltage space vector, which is generated by the converter power electronics driven in pulse-width-modulated fashion, and used to feed the motor.

The automatic control unit, in each case cyclically, determines a new voltage space vector. In each cycle, first of all the new angular value is determined from the transmitted second value, thus sub-angle value and/or fine-angle value. In so doing, preferably check information, e.g., a CRC datum, thus, cyclic redundancy check datum, is used. In this manner, the transmission of the second value is made reliable and is able to be checked. After the new angular value has been determined, a new value is determined for the voltage space vector by the automatic control unit. Thus, the new voltage space-vector value is determined in each cycle. The available time span still remaining in each cycle is not always equally long in each cycle, but rather fluctuates as a function of the time for calculating the voltage space vector. In this time span, the subsequently transmitted first value of the angle information is received, especially followed by further check information, e.g., a CRC datum, thus, cyclic redundancy check datum. Therefore, the detected angular value is then determinable from the first and second values and is able to be compared to the angular value determined previously only from the first value. In this manner, the angular value determined from the limited information is thus able to be checked, and in the event of a deviation, a suitable action is able to be initiated, if appropriate. If the time span remaining in the cycle is no longer sufficient for determining the detected angular value and for the comparison, they are carried out in a following cycle or repeated with the then latest detected values.

In this manner, reliability in the data transmission is thus increased, and nevertheless, rapid determination of the voltage space vector is made possible.

LIST OF REFERENCE SYMBOLS $P_A$ previously detected angular value
P* estimated value for angle
P newly determined angular value
F intermediate value
F' second intermediate value
$v_A$ previously determined angular velocity

What is claimed is:

1. A method for closed-loop control of a drive, comprising:
   recurrently detecting a position value over time; and
   transmitting associated information to a control device;
   wherein the position value includes at least two values, including a partial-angle value, a fine-angle value, and/or digital values, a first value being denotable with a whole number, and a position-value range being assigned to each number, each position range including a first value being assigned mutually separate sub-ranges of the position range, each of these sub-ranges including a second value denotable as a whole number, the second value being transmitted prior in time to the first value;
wherein:
(i) after a newly detected second value has been transmitted, a model value is determined for the first value from the newly detected and a previously transmitted second value, and the position value determined is used by a control device to determine an updated value of a manipulated variable of the control device; and
(ii) after the newly detected second value has been transmitted, the newly detected first value is transmitted, and the model value determined is compared to the newly detected first value, and an action is carried out if they do not agree,
wherein the action includes communication and/or display of warning information, bringing the drive to rest, and/or transferring the drive into a safe state;
wherein the manipulated variable includes a voltage space vector and/or a stator-voltage space vector of an electric motor of the drive.

2. The method according to claim 1, wherein the method include repeating the step (i).

3. The method according to claim 1, wherein:
in transmitting the second value, check information and/or a CRC datum, is transmitted, and upon detection of a faulty transmission, an action is triggered, including display and/or communication of warning information, switching off the drive, and/or initiating a safe state of the drive, and/or
in transmitting the first value, further check information and/or a CRC datum, is transmitted, and upon detection of a faulty transmission, an action is triggered, including display and/or communication of warning information, switching off the drive, and/or initiating a safe state of the drive.

4. The method according to claim 1, wherein the method includes cyclic digital transmission of a position value of a moving object with an inertial mass, at a known maximum attainable velocity of the object, the value range of the transmitted position value being restricted such no complete rotation or other complete period caused by mechanical conditions may be mapped, and an actual, complete position being formed by detecting value-range exceedances in an evaluation unit; and
wherein (a) at a first instant, a position is transmitted which is not or is far less sharply value-range-restricted than in continuous operation; (b) the value range is determined in a manner that an amount of a path difference occurring in one scanning cycle at maximum velocity is less than half the selected value range, the value range being selected to be as small as possible; and/or (c) a difference relative to a previous position with a same value-range restriction is transmitted.

5. The method according to claim 1, wherein the method includes cyclic digital transmission of a position value of a moving object with an inertial mass, at a known maximum attainable velocity of the object, the value range of the transmitted position value being restricted compared to the value range of possible position values, so that no complete rotation or other complete period caused by mechanical conditions may be mapped, an actual position being determined by forming an estimated value for the position from a previous position and at previously determined velocity, and correcting it by the value-range-restricted transmitted position value; and wherein (a) by comparing the value-range-restricted estimated position value to the value-range-restricted transmitted position value, a value-range exceedance is ascertained and utilized to correct the estimated value; (b) one time at a beginning, a position and a velocity is transmitted whose value range includes the range of possible positions and velocities occurring; and/or (c) a difference relative to the previous position with a same value-range restriction is transmitted.

6. The method according to claim 1, wherein the method includes cyclic digital transmission of a position value of a moving object with inertial mass, at a known maximum attainable velocity of the object, the position value including at least two values, including a partial-angle value, a sub-angle value, a fine-angle value, and/or digital values, a first value being denotable with a whole number, and a position range being assigned to each number, each number denoting a respective assigned position range, each position range including a first value being assigned mutually separate sub-ranges of the position range, each of these sub-ranges including a second value denotable as a whole number, at a first instant, a position value being detected and thereafter associated first and second values being transmitted;
wherein a further position value is detected and an associated, newly detected, second value is transmitted; and
wherein, from the newly detected second value and the previously detected second value, the position range characterized by the first value is determined, and the first value belonging to the newly detected position value.

7. The method according to claim 1, wherein the method includes digital transmission of a position value of a moving object with inertial mass, the position value including at least two values, including a partial-angle value, a sub-angle value, a fine-angle value, and/or digital values, a first value being denotable with a whole number, and a position range being assigned to each number, each number denoting a respective assigned position range, each position range including a first value being assigned mutually separate sub-ranges of the position range, each of the sub-ranges including a second value denotable as a whole number, at a first instant, a position value and an initial velocity being detected and thereafter associated first and second values being transmitted;
wherein a further position value is detected and an associated, newly detected, second value is transmitted, an updated velocity being determined and transmitted, at least with sufficient accuracy, a quantity of exceeded ranges, fine-angle ranges and/or sub-angle ranges, assigned to the second value as velocity; and
wherein, from the newly detected second value and the previously detected second value, the position range characterized by the first value is determined, and also the first value belonging to the newly detected position value, in doing which, the velocity being taken into account.

8. The method according to claim 1, wherein the position value includes an angular value of a rotating part having an inertial mass having a moment of inertia, or a path-position value of a moving part that has an inertial mass.

9. The method according to claim 1, wherein the transmitting is repeated recurrently over time or is repeated cyclically at regular time intervals, steps (i) and (ii) being carried out repeatedly in succession.

10. The method according to claim 1, wherein the position value is an angular value or a linear position, velocity being an angular velocity or a velocity occurring in a linear direction.

11. The method according to claim 1, wherein the first and second values are assigned to a track and/or an encoder track, each, the first value being assigned to a finer resolving track than the second value.

12. A device, comprising:
a sensor adapted to detect a position value;
an evaluation unit connected to the sensor via a digital interface, the evaluation unit including a memory and adapted to determine the position value from a transmitted value-range-restricted position value; and
a control device connected to the evaluation unit;
wherein the device is adapted to perform the method recited in claim 1.

13. A method for closed-loop control of a drive, comprising:
recurrently detecting a position value over time; and
transmitting associated information to a control device;
wherein the position value includes at least two values, including a partial-angle value, a fine-angle value, and/or digital values, a first value being denotable with a whole number, and a position-value range being assigned to each number, each position range including a first value being assigned mutually separate sub-ranges of the position range, each of these sub-ranges including a second value denotable as a whole number, the second value being transmitted prior in time to the first value;
wherein:
(i) after a newly detected second value has been transmitted, a model value is determined for the first value from the newly detected and a previously transmitted second value, and the position value determined is used by a control device to determine an updated value of a manipulated variable of the control device; and
(ii) after the newly detected second value has been transmitted, the newly detected first value is transmitted, and the model value determined is compared to the newly detected first value, and an action is carried out if they do not agree;
wherein the action includes communication and/or display of warning information, bringing the drive to rest, and/or transferring the drive into a safe state;
wherein the manipulated variable includes a voltage space vector and/or a stator-voltage space vector of an electric motor of the drive; and
wherein:
(a) in step (ii), an estimated value is determined from the previously detected or determined position value and the associated velocity, and the second value of the newly detected position value is compared to the second value of the estimated value, and the difference is determined between the second value of the newly detected position value and the second value of the estimated value, and therefrom, the position range belonging to the newly detected position value is determined;
(b) in step (ii), the difference is determined between the newly detected second value and the previously detected second value, and upon exceedance of one half position range, it being inferred that the newly detected position value lies in an adjacent position range;
(c) in step (ii), the newly detected second value and previously detected second value are compared, and the adjacent range in which the newly detected position value is located is determined, if the difference between the newly detected second value and the previously detected second value exceeds one half position range;
(d) a change in velocity between two detections of position carried out in succession at a time interval is limited to one critical value, which is determined or at least co-determined by inertial mass; and/or
(e) the method is used on a system in which a force acting on the object or torque acting on the object between two detections of position carried out in succession at a time interval is limited to one critical value, which is determined or at least co-determined by inertial mass.

14. A method for closed-loop control of a drive, comprising:
recurrently detecting a position value over time; and
transmitting associated information to a control device;
wherein the position value includes at least two values, including a partial-angle value, a fine-angle value, and/or digital values, a first value being denotable with a whole number, and a position-value range being assigned to each number, each position range including a first value being assigned mutually separate sub-ranges of the position range, each of these sub-ranges including a second value denotable as a whole number, the second value being transmitted prior in time to the first value;
wherein:
(i) after a newly detected second value has been transmitted, a model value is determined for the first value from the newly detected and a previously transmitted second value, and the position value determined is used by a control device to determine an updated value of a manipulated variable of the control device; and
(ii) after the newly detected second value has been transmitted, the newly detected first value is transmitted, and the model value determined is compared to the newly detected first value, and an action is carried out if they do not agree;
wherein the action includes communication and/or display of warning information, bringing the drive to rest, and/or transferring the drive into a safe state;
wherein the manipulated variable includes a voltage space vector and/or a stator-voltage space vector of an electric motor of the drive; and
wherein each position range characterized by a second value and/or a sub-angle value, is assigned mutually separate sub-ranges of the position range, each of the sub-ranges including a third value and/or a fine-angle value, which is denotable as a whole number, at a first instant, the position value being detected, and associated first and second and third values being transmitted, the third value being transmitted with, prior to, and/or after the second value.

* * * * *